US012657674B2

(12) United States Patent (10) Patent No.: US 12,657,674 B2
Jee et al. (45) Date of Patent: Jun. 16, 2026

(54) IMAGE PROCESSING METHOD GENERATING HIGH QUALITY IMAGE AND IMAGE PROCESSING APPARATUS PERFORMING THE SAME

(71) Applicants: SAMSUNG ELECTRONICS CO., LTD., Suwon-si (KR); UIF (University Industry Foundation), Yonsei University, Seoul (KR)

(72) Inventors: Seunghoon Jee, Suwon-si (KR); Moongi Kang, Seoul (KR); Haegeun Lee, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 343 days.

(21) Appl. No.: 18/221,134

(22) Filed: Jul. 12, 2023

(65) Prior Publication Data

US 2024/0046434 A1 Feb. 8, 2024

(30) Foreign Application Priority Data

Jul. 28, 2022 (KR) ........................ 10-2022-0093651

(51) Int. Cl.
*G06T 5/92* (2024.01)
*G06T 5/20* (2006.01)
(Continued)

(52) U.S. Cl.
CPC .................. *G06T 5/92* (2024.01); *G06T 5/20* (2013.01); *G06T 5/70* (2024.01); *G06T 7/0002* (2013.01);
(Continued)

(58) Field of Classification Search
CPC .... G06T 5/92; G06T 5/70; G06T 5/20; G06T 7/0002; G06T 2207/20192; G06T 2207/20208; G06T 2207/30168
(Continued)

(56) References Cited

U.S. PATENT DOCUMENTS 9,330,442 B2 * 5/2016 Kang ........................ G06T 5/70
9,635,340 B2 4/2017 Choi
(Continued)

FOREIGN PATENT DOCUMENTS

CN 110232661 B * 1/2023 ............. G06N 3/082
JP 5488482 B2 5/2014
(Continued)

OTHER PUBLICATIONS

Wang, Wencheng, Yuan, Xiaohui, Chen, Zhenxue, Wu, XiaoJin, Gao, Zairui, Weak-Light Image Enhancement Method Based on Adaptive Local Gamma Transform and Color Compensation, Journal of Sensors, 2021, 5563698, 18 pages, 2021. https://doi.org/10.1155/2021/5563698 (Year: 2021).*
(Continued)

*Primary Examiner* — Jennifer Mehmood
*Assistant Examiner* — Eric James Shoemaker
(74) *Attorney, Agent, or Firm* — Sughrue Mion, PLLC

(57) ABSTRACT

An image processing method includes receiving an image, calculating a luminance component of the received image, estimating an illuminance component of the image by using the luminance component, calculating a gamma value, based on the luminance component and the illuminance component, and calculating the luminance component with an improved dynamic range using a conversion ratio based on the gamma value.

20 Claims, 9 Drawing Sheets

(51) Int. Cl.
　　*G06T 5/70*　　　　(2024.01)
　　*G06T 7/00*　　　　(2017.01)
(52) U.S. Cl.
　　CPC ............... *G06T 2207/20192* (2013.01); *G06T 2207/20208* (2013.01); *G06T 2207/30168* (2013.01)
(58) Field of Classification Search
　　USPC ........................................................ 382/263
　　See application file for complete search history.

(56) References Cited

U.S. PATENT DOCUMENTS

| | | | |
|---|---|---|---|
| 2012/0188244 | A1 | 7/2012 | Kida |
| 2017/0098317 | A1* | 4/2017 | Qi ......................... G06T 11/008 |
| 2021/0150744 | A1 | 5/2021 | Sambongi et al. |
| 2023/0029073 | A1 | 1/2023 | Jee et al. |

FOREIGN PATENT DOCUMENTS

| | | |
|---|---|---|
| KR | 10-1310923 B1 | 9/2013 |
| KR | 10-2016-0060358 A | 5/2016 |
| KR | 10-2061017 B1 | 12/2019 |

OTHER PUBLICATIONS

Karamjeet Singh, Sukhjeet Kaur Ranade, Chandan Singh, Comparative performance analysis of various wavelet and nonlocal means based approaches for image denoising, Optik, vol. 131, 2017, pp. 423-437, ISSN 0030-4026, https://doi.org/10.1016/j.ijleo.2016.11.055. (Year: 2017).*

X. Fu, D. Zeng, Y. Huang, X. Ding and X.-P. Zhang, "A variational framework for single low light image enhancement using bright channel prior," 2013 IEEE Global Conference on Signal and Information Processing, Austin, TX, USA, 2013, pp. 1085-1088, doi: 10.1109/GlobalSIP.2013.6737082. (Year: 2013).*

K. Dabov, A. Foi, V. Katkovnik and K. Egiazarian, "Color Image Denoising via Sparse 3D Collaborative Filtering with Grouping Constraint in Luminance-Chrominance Space," 2007 IEEE International Conference on Image Processing, 2007, pp. I-313-I-316, doi: 10.1109/ICIP.2007.437895 (Year: 2007).*

Ming-Hui Cheng, Ting-Zhu Huang, Xi-Le Zhao, Tian-Hui Ma, Jie Huang, "A variational model with hybrid Hyper-Laplacian priors for Retinex," Applied Mathematical Modelling, vol. 66, 2019, pp. 305-321, https://doi.org/10.1016/j.apm.2018.09.022. (Year: 2019).*

Geiger, Andreas et al., "Efficient Large-Scale Stereo Matching", Computer Vision—ACCV 2010, pp. 25-38. (15 pages total).

Song, Ki Sun et al., "Hue-preserving and saturation-improved color histogram equalization algorithm", Journal of the Optical Society of America A, vol. 33, No. 6, Jun. 2016, pp. 1076-1088. (13 pages total).

Cheng, Xuelian et al., "Hierarchical Neural Architecture Search for Deep Stereo Matching", arXiv:2010.13501v1 [cs.CV], Oct. 26, 2020. (12 pages total).

\* cited by examiner

SECOND IMAGE PROCESSING METHOD

710

720

730

IMAGE PROCESSING METHOD GENERATING HIGH QUALITY IMAGE AND IMAGE PROCESSING APPARATUS PERFORMING THE SAME

CROSS-REFERENCE TO RELATED APPLICATION

This application is based on and claims priority under 35 U.S.C. § 119 to Korean Patent Application No. 10-2022-0093651, filed on Jul. 28, 2022, in the Korean Intellectual Property Office, the disclosure of which is incorporated by reference herein in its entirety.

BACKGROUND

1. Field

The disclosure relates to an image processing method and image processing apparatus performing the image processing method.

2. Description of the Related Art

Recently, a method of removing deterioration of an input image from a signal processing point of view has been researched as part of an image quality improvement technology. For example, the image quality improvement technology, which includes noise removal technology that removes noise generated during an image obtaining process and contrast enhancement technology that improves a dynamic range narrowed due to the limited amount of light have been widely researched.

SUMMARY

Provided are an image processing method of improving a dynamic range of input image data and/or removing noise from input image data, and an image processing apparatus performing the image processing method.

Additional aspects will be set forth in part in the description which follows and, in part, will be apparent from the description, or may be learned by practice of the presented embodiments of the disclosure.

According to an aspect of the disclosure, there is provided an image processing method including: receiving a first image; calculating a luminance component of the first image; estimating an illuminance component of the first image by using the luminance component; calculating a gamma value, based on the luminance component and the illuminance component; calculating a modified luminance component using a conversion ratio based on the gamma value; and generating a second image corresponding to the first image based on the modified luminance component.

According to another aspect of the disclosure, there is provided an image processing method including: receiving a first image; setting a reference patch and target patches in the first image by designating an arbitrary pixel included in the first image as a center pixel of the reference patch, the reference patch includes a plurality of pixels and the target patches correspond to the reference patch; calculating a dissimilarity value corresponding to an amount of dissimilarity between the reference patch and the target patches; and generating a second image by removing noise of the center pixel of the reference patch of the first image from center pixel values of the target patches of the first image according a weight based on the dissimilarity value.

According to another aspect of the disclosure, there is provided an image processing method including: receiving a first image; calculating a luminance component of the first image; estimating an illuminance component of the first image by using the luminance component; calculating a gamma value, based on the luminance component and the illuminance component; calculating a modified luminance component using a conversion ratio based on the gamma value; and setting a reference patch and target patches in the first image by designating an arbitrary pixel included in the first image as a center pixel of the reference patch, the reference patch includes a plurality of pixels and the target patches correspond to the reference patch; calculating a dissimilarity value corresponding to an amount of dissimilarity between the reference patch and the target patches; and generating a second image based on the modified luminance component and by removing noise of the center pixel of the reference patch of the first image from center pixel values of the target patches of the first image according a weight based on the dissimilarity value.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
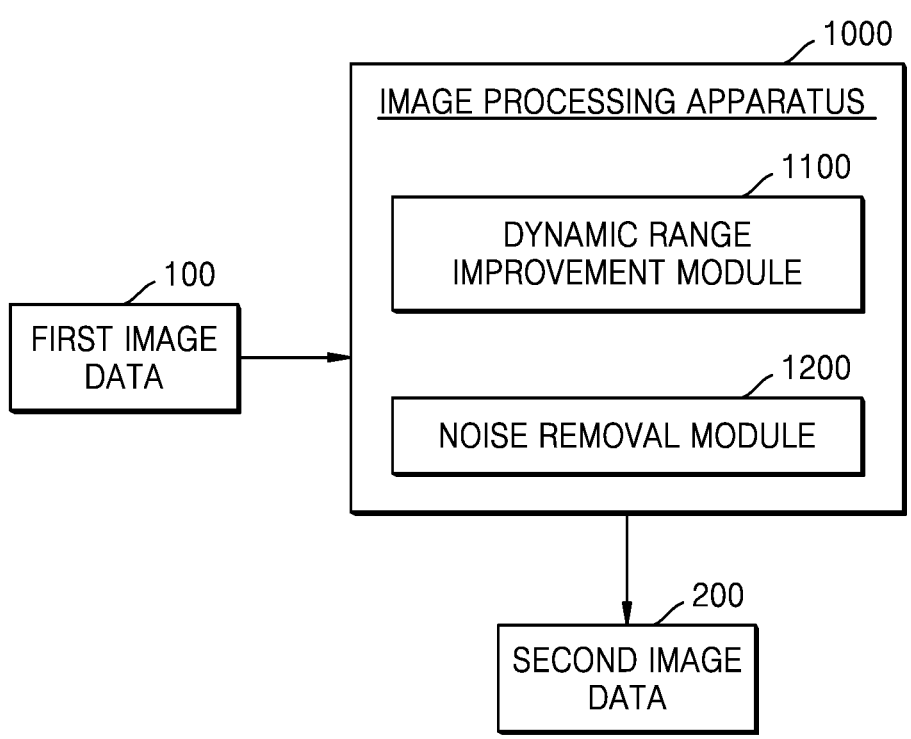
FIG. 1 is a block diagram of an image processing apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present embodiments are selected as currently widely used general terms as possible while considering the functions in the present embodiments, which may vary depending on intention or precedent of a person skilled in the art, emergence of new technology, etc. In addition, there are also randomly selected terms in a certain case, and in this case, the meaning will be described in detail in describing the embodiment. Therefore, the terms used in the present embodiments should be defined based on meaning of the term and overall content of the present embodiments, rather than a simple name of the term.

In describing the embodiments, when it is described that a certain portion is connected to another portion, this includes not only a case in which the certain portion is directly connected another portion, but also a case in which the certain portion is electrically connected to another portion with another component therebetween. Singular expressions include plural expressions unless the context clearly indicates otherwise. In addition, when a portion "includes" a certain component, this means that other components may be further included rather than excluding other components unless specifically stated to the contrary.

Terms such as "include", or "comprise" used in the present embodiments should not be construed as including all of the various components or various operations described in the specification, and it should be construed that some components or operations may not be included or may further include additional components or operations.

In addition, terms including ordinal numbers such as "first" or "second" used in this specification may be used to describe various components, but the components should not be limited by the terms. The terms described above may be used for the purpose of distinguishing one component from another component.

The description of the following embodiments should not be construed as limiting the scope of rights, and what may be easily inferred by those skilled in the art should be construed as belonging to the scope of the embodiments. Hereinafter, embodiments for purposes of illustration will be described in detail with reference to the accompanying drawings.

In the disclosure, an 'image processing apparatus' may be a generic term for an electronic device capable of generating or processing an image.

In the disclosure, illuminance is a value obtained by quantifying the amount of light emitted from a light source reaching a subject of an object. Luminance is a value obtained by quantifying the brightness of a reflective surface where light emitted from a light source is reflected from a subject. Therefore, the luminance is affected by a degree of reflection of a target surface.

FIG. 1 is a block diagram of an image processing apparatus 1000 according to an example embodiment.

According to an example embodiment, the image processing apparatus 1000 may be, without being limited, to any apparatus having an image processing and/or display function, such as a smart phone, a tablet PC, a notebook PC, a head mounted display (HMD), a near eye display (NED), a large format display (LFD), a digital signage, a digital information display (DID), a video wall, a projector display, a camera, a camcorder, a printer, an augmented reality glasses device, etc.

Referring to FIG. 1, the image processing apparatus 1000 according to an example embodiment may receive first image data 100 and generate second image data 200 by processing the first image data 100. The image processing apparatus 1000 may include a dynamic range enhancement module 1100 and a noise removal module 1200. In some example embodiments, the image processing apparatus 1000 may be configured to selectively include only any one of the dynamic range enhancement module 1100 and the noise removal module 1200.

According to an example embodiment, the modules of the stereo matching apparatus may be implemented as a hardware component, a software component, and/or a combination of the hardware component and the software component. For example, the image processing apparatus 1000 and/or the modules described in the example embodiments illustrated in FIG. 1 may be implemented by using a processor, an arithmetic logic unit (ALU), application specific integrated circuits (ASICs), digital signal processors (DSPs), digital signal processing devices (DSPDs), programmable logic devices (PLDs), a microcomputer, a microprocessor, or one or more general purpose computers or special purpose computers like any other device capable of executing and responding to instructions. Moreover, according to an example embodiment, the image processing apparatus 1000 may include a memory storing one or more instructions or program code, which when executed by the processor may perform various operations as described below. However, the disclosure is not limited thereto, and as such, the image processing apparatus 1000 may be implemented in a different manner.

The dynamic range enhancement module 1100 generates output image data by improving a dynamic range of input image data through a first image processing method.

The noise removal module 1200 generates the output image data by removing noise from the input image data through a second image processing method.

When the image processing apparatus 1000 is configured to include the dynamic range enhancement module 1100 and the noise removal module 1200, the image processing apparatus 1000 may generate the second image data 200 by improving the dynamic range of the first image data 100 and removing the noise through the first image processing method and the second image processing method. In the image processing of the image processing apparatus 1000, the image processing of the dynamic range enhancement module 1100 and the image processing of the noise removal module 1200 may not be constrained to an order. In other words, an image processing method performed by the image processing apparatus 1000 is not constrained to the order of the first image processing method and the second image processing method. That is, even though the second image processing method is performed first and the first image processing method is performed later, there is no problem in the function of the image processing apparatus 1000.

Figure 2:
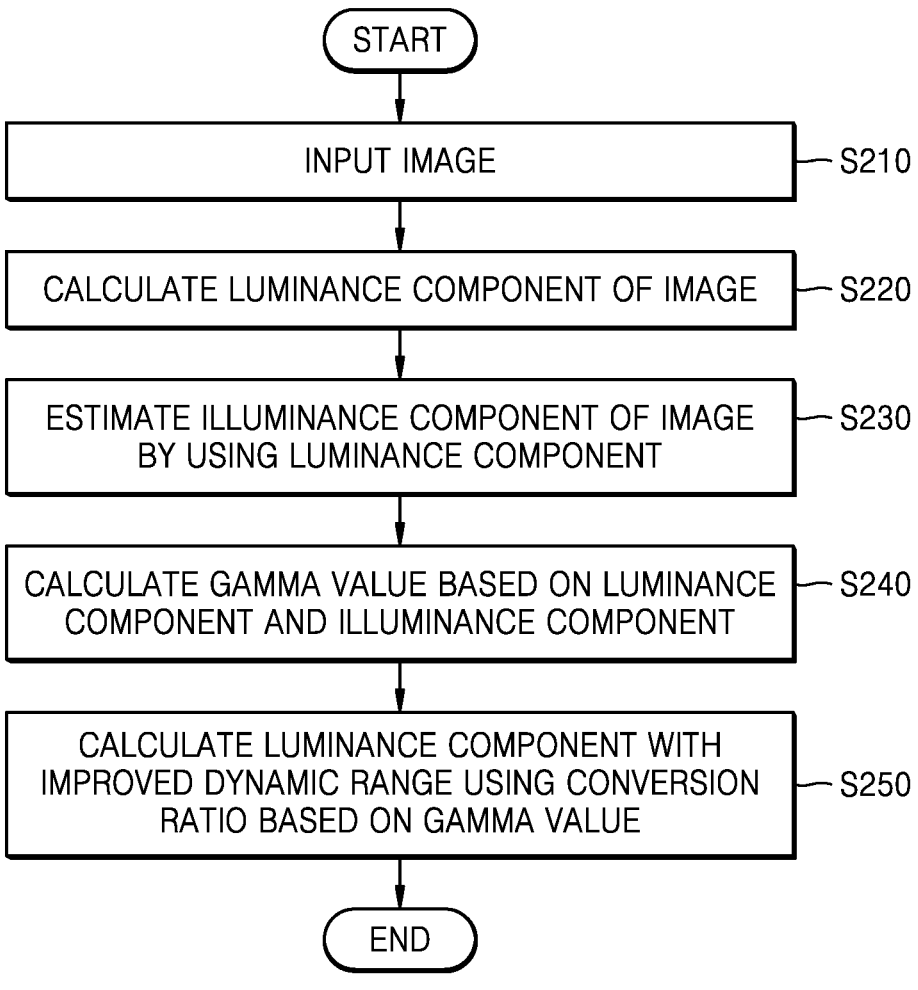
FIG. 2 is a flowchart of a first image processing method according to an example embodiment.

FIG. 2 is a flowchart of a first image processing method according to an example embodiment.

The first image processing method of the dynamic range enhancement module 1100 is described with reference to FIGS. 1 and 2. The dynamic range enhancement module 1100 receives the first image data 100 and generates the second image data 200 by improving a dynamic range of the first image data 100 through the first image processing method.

According to an example embodiment, in operation S210 an input image is received. According to an example embodiment, the input image may be the first image data 100. The received first image data 100 may be image data in an RGB format. The RGB format is used to express colors using the three primary colors of light. The RGB format is called 'additive mixing' because the more colors are mixed by using light sources of three kinds of red, green, and blue, the colors get brighter. According to an example embodiment, each of the red R, green G, and blue B colors have a value from 0 to a maximum value (e.g., 255), represent black when all of R, G, and B have the value of 0, and represent white when all of R, G, and B have the maximum value.

According to an example embodiment, in operation S220 a luminance component of the first image 100 is calculated. For example, operation S220 is an operation of calculating the luminance component of the first image 100 by dividing the first image 100 into the luminance component and a color component. Specifically, the luminance component may be calculated from the first image by converting the first image in the RGB format to a YUV format and obtaining a Y value. The YUV format is a format that separates and displays the luminance (brightness) component Y from color information. The color information of each unit image is expressed as the luminance component Y, a difference U between the luminance component Y and a blue component, and a difference V between the luminance component Y and a red component. Accordingly, when the color information is expressed in the YUV format, brightness information may be separated from the color information by reading the Y value.

According to an example embodiment, in S230 an illuminance component of the first image is estimated from the luminance component of the first image. Specifically, the illuminance component may be estimated by designing a cost function with respect to the relationship between the luminance component and the illuminance component and calculating a value that minimizes the cost function. Illuminance is a value obtained by quantifying the amount of light that a light source illuminates an object, and may exhibit characteristics of the overall image and each detail part. The first image processing method estimates an illuminance component from a luminance component of an image, and improves a dynamic range of an input image based on the estimated illuminance component.

Luminance is a value obtained by quantifying a degree of reflection of light emitted from a light source on a subject, and may be seen as a value derived from illuminance. The cost function of the relationship between illuminance and luminance may be expressed by Equation 1 below, $$F(m) = \|m - y\|_2^2 + \lambda_1 \|Cm\|_2^2 + \lambda_2 \|\nabla(m - y)\|_2^2 \qquad \text{[Equation 1]}$$

where, F(m) is a cost function, m is a vector representing an illuminance component, and y is a vector representing a luminance component. C is a Laplacian filter serving as a high pass filter. $\nabla$ is a gradient operator acting as determining edge information in an image. $\lambda_1$ and $\lambda_2$ are regularization parameters that determine the importance of each item in the cost function.

Because luminance means the amount of light excluding light reflected and absorbed by the subject from the illuminance component, illuminance has a high similarity to luminance.

A first item $$\|m - y\|_2^2$$

of the cost function F(m) means a first similarity between the luminance component and the illuminance component, and the first similarity may be calculated by performing a norm operation on a difference value between the luminance component and the illuminance component. That is, the first item $$\|m - y\|_2^2$$

is expressed as a data fidelity item in the cost function.

A second item $$\lambda_1 \|Cm\|_2^2$$

of the cost function F(m) means high frequency information of the illuminance component. The high frequency information may be calculated by performing a norm operation on the illuminance component passing through the Laplacian filter. Because a light source generally illuminates a subject and surroundings thereof in a wide range, illuminance exhibits smoothness throughout the image. $\lambda_1$ is a parameter that determines the importance of energy of illuminance passing through the Laplace filter. That is, by controlling the $\lambda_1$ value to limit the energy of the illuminance, a smooth illuminance image may be obtained by suppressing a high frequency component of the illuminance.

However, in this process, a boundary of the subject may collapse. In a process of improving the dynamic range of the first image according to the first image processing method, halo and ringing artifacts may occur. In order to prevent the boundary of the subject from collapsing, it is necessary to reflect an item that guarantees the similarity of edge components of illuminance and luminance to the cost function F(m). The item that guarantees the similarity of the edge components of illuminance and luminance is reflected as a third item $$\lambda_2 \|\nabla(m - y)\|_2^2$$

as below.

The third item $$\lambda_2 \|\nabla(m - y)\|_2^2$$

of the cost function F(m) means a second similarity between the luminance component and the illuminance component. The second similarity may be calculated by performing a norm operation on a gradient value of a difference between the luminance component and the illuminance component. $\lambda_2$ is a parameter that determines the importance of the second similarity between illuminance and luminance. That is, by adjusting the $\lambda_2$ value, the degree of reflection of the similarity between the edge components of illuminance and the luminance may be adjusted.

The illuminance component may be estimated by calculating m that minimizes the cost function F(m) through an optimization method.

According to an example embodiment, because each item of the cost function includes an $L_2$-norm, convexity is verified. When the cost function F(m) is developed as an inverse function and the value of m that makes an expression differentiated by m equal to 0 is obtained, Equation 2 may be derived as below, $$\hat{m} = \underset{m}{\mathrm{argmin}}F(m) = \frac{\left(I + \lambda_2 \nabla^T \nabla\right)y}{1 + \lambda_1 C^T C + \lambda_2 \nabla^T \nabla} \qquad \text{[Equation 2]}$$

where $\hat{m}$ denotes a vector representing the illuminance component estimated through the dynamic range enhancement module 1100, and I denotes a unit matrix.

According to an example embodiment, in operation S240, a gamma value is calculated based on the luminance component and the illuminance component. The gamma value may be a value obtained by dividing the luminance component by the illuminance component as shown in Equation 3 below. The gamma value is used to derive an image with an improved dynamic range by applying a gamma curve to the input image.

$$\gamma(y_i, \hat{m}_i) = \frac{y_i}{\hat{m}_i} \qquad \text{[Equation 3]}$$

where $\gamma$ is the gamma value, $\hat{m}_i$ is an illuminance value of an $i^{th}$ pixel, and $y_1$ is luminance of the $i^{th}$ pixel.

In a dark pixel i with a large amount of absorbed light, because illuminance $(\hat{m}_i)$ has a higher value than luminance $(y_i)$, the gamma value has a value of $\gamma(y_i, \hat{m}_i)<1$. In a relatively bright pixel i where reflected light is dominant, because the illuminance $(\hat{m}_i)$ and the luminance $(y_i)$ have similar values, the gamma value has a value of $\gamma(y_i, \hat{m}_i)\approx1$.

According to an example embodiment, in operation S250 the luminance component with an improved dynamic range may be calculated by using a conversion ratio based on the gamma value of Equation 3. The conversion ratio may be expressed by the gamma curve of Equation 4, $$\hat{y}_i = y_{i,max} \cdot \left(\frac{y_i}{y_{i,max}}\right)^{\gamma} \qquad \text{[Equation 4]}$$

where $y_{i,max}$ is the maximum value in the luminance of neighboring pixels of the $i^{th}$ pixel, $\hat{y}_i$ is luminance of the $i^{th}$ pixel with an improved dynamic range, and $y_i$ is the luminance of the $i^{th}$ pixel. The neighboring pixel may correspond to at least one pixel adjacent to the $i^{th}$ pixel, a pixel group including at least one pixel surrounding the $i^{th}$ pixel, or a pixel group constituting an entire frame including the pixel.

Figure 3:
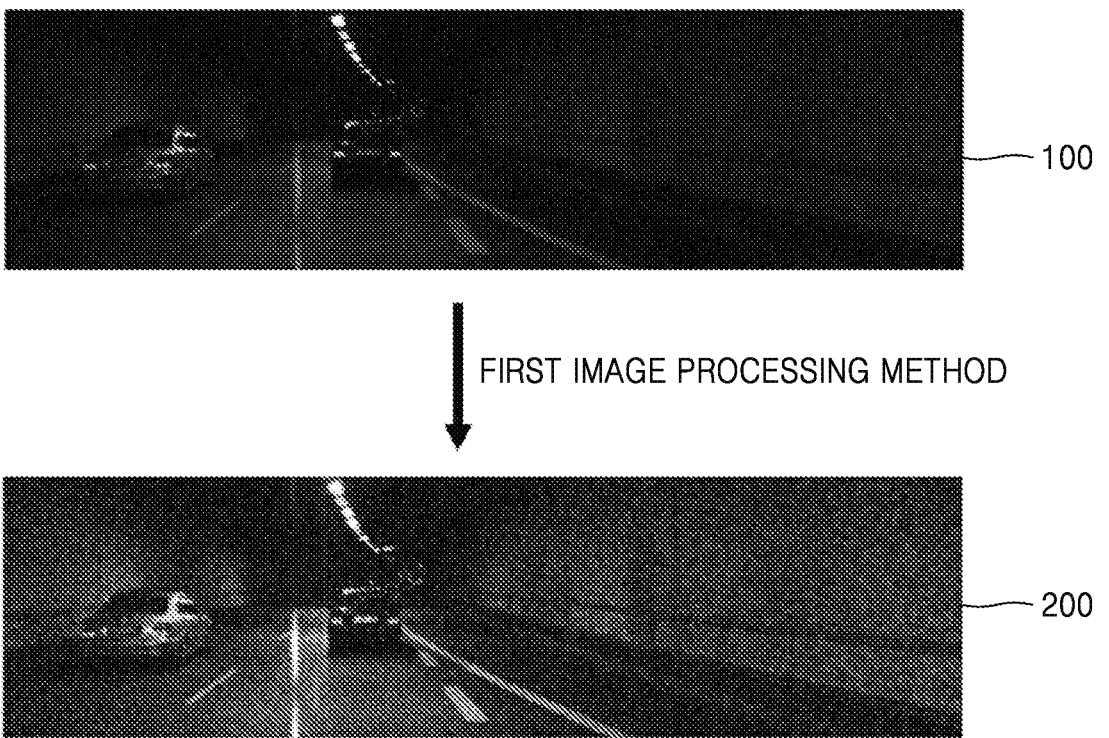
FIG. 3 illustrates an example of a second image of which a dynamic range is improved through a first image processing method and a first image.

FIG. 3 illustrates an example of a second image of which a dynamic range is improved through a first image processing method and a first image.

The first image is an image captured in a low illuminance environment represented by a tunnel, and it is difficult to distinguish between subjects with the naked eye. On the other hand, the second image, in which a dynamic range is improved through the first image processing method, makes it easy to recognize and identify an important object such as vehicles, lanes, and lights by clarifying a boundary between an object and a background.

Figure 4:
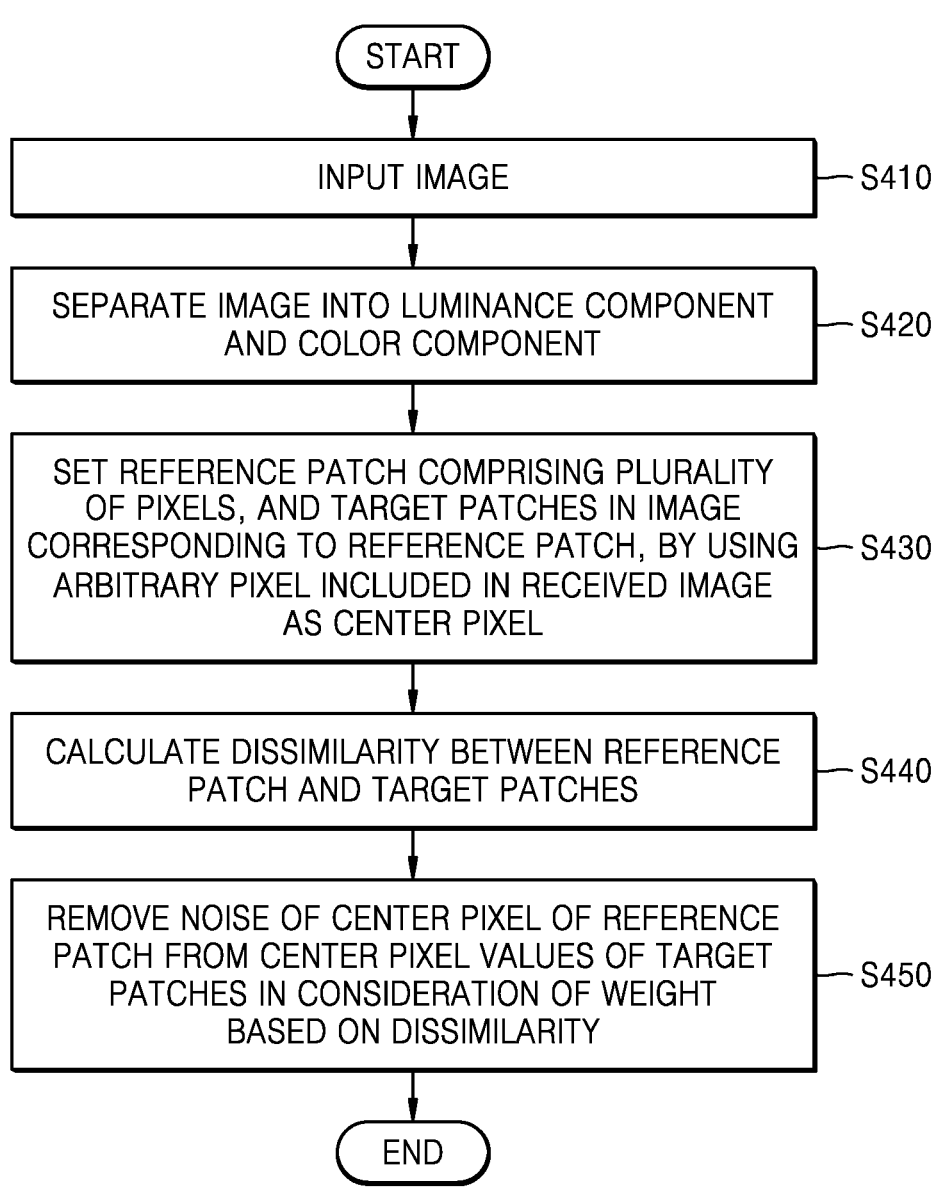
FIG. 4 is a flowchart of a second image processing method according to an example embodiment.

FIG. 4 is a flowchart of a second image processing method according to an example embodiment.

The second image processing method of the noise removal module 1200 is described with reference to FIGS. 1 and 4.

The noise removal module 1200 receives the first image data 100 and generates the second image data 200 by removing noise from the first image data 100 through a second image processing method.

The first image data 100 may be expressed by Equation 5 below, $$\hat{y} = \tilde{y} + n \qquad \text{[Equation 5]}$$

where, as the first image data 100, $\hat{y}$ is a luminance image in which noise is present, $\tilde{y}$ is a dean luminance image without noise, and n is a vector representation of Gaussian noise. It is assumed that a general image is mainly added with Gaussian noise, which is mainly considered as random noise, during an obtaining process. Therefore, the second image processing method of removing the noise of an input image aims to effectively remove n from $\hat{y}$.

The algorithm of the proposed second image processing method is based on a non-local means (NLM) algorithm structure of Equations 6 and 7 below, $$\tilde{y}_i = \sum_{j\in \mathcal{N}_i} \frac{1}{K_i} k_{i,j} \hat{y}_j \qquad \text{[Equation 6]}$$

$$K_i = \sum_{j\in \mathcal{N}_i} k_{i,j} \qquad \text{[Equation 7]}$$

where i and j denote the $i^{th}$ pixel and a $j^{th}$ pixel of the first image data 100, respectively, $\hat{y}_j$ is a luminance value of the $j^{th}$ pixel including noise as the first image data 100, $\hat{y}_i$ is a luminance value of the $i^{th}$ pixel from which noise is removed, $N_i$ is a set of surrounding pixels with respect to the $i^{th}$ pixel, and $k_{i,j}$ is a weight for quantifying the correlation between an $i^{th}$ pixel group and a p pixel group. $K_i$ is a regularization factor that limits the sum of $k_{i,j}$ to 1.

The noise of the first image data 100 may be effectively removed by precisely designing the weight $k_{i,j}$. In the second image processing method according to the embodiment, important information, such as an edge, may be reflected without omission by removing noise based on a guidance image. The weight $k_{i,j}$ is described in detail with reference to Equations 8 to 10.

Operation S410 is an operation of receiving the first image data 100. The received first image data 100 may be image data in an RGB format.

Operation S420 is an operation of separating a first image into a luminance component and a color component. For example, the first image in the RGB format may be converted into a YUV format and separated into a Y value, which is the luminance component, and U and V values, which are color components.

Operation S430 is an operation of setting a reference patch including a plurality of pixels by using an arbitrary pixel included in the input image as a center pixel and target patches in the image corresponding to the reference patch. A patch indicates a region having a certain range, and may mean a block having a shape, such as a rectangle. The center pixel of the target patch becomes a pixel removing noise existing in the center pixel of the reference patch.

Operation S440 is an operation of calculating dissimilarity between the reference patch and the target patches. The dissimilarity may be measured through the Euclidean distance between the reference patch and the target patches, and is expressed by Equation 8 below, $$d(\mathcal{G}_i, \mathcal{G}_j) = \|g(\mathcal{G}_i) - g(\mathcal{G}_j)\|_2^2 \qquad \text{[Equation 8]}$$

where $\mathcal{G}_i$ and $\mathcal{G}_j$ are a reference patch having the $i^{th}$ pixel as the center pixel and a target patch having the $j^{th}$, pixel as the center pixel, respectively. $d(\cdot, \cdot)$ denotes dissimilarity or distance between two patches. The Euclidean distance is suitable for minimizing the Gaussian noise assumed by the proposed model because a distance between patches is calculated through the square of the $L_2$-norm. The more similar the two patches, the smaller value $d(\mathcal{G}_i, \mathcal{G}_j)$ has, and the more dissimilar the two patches, the greater value $d(\mathcal{G}_i, \mathcal{G}_j)$ has.

In another example embodiment, the dissimilarity may be measured through the Kullback-leibler distance between the reference patch and the target patches, as shown in Equation 9 below.

$$d(\mathcal{G}_i, \mathcal{G}_j) = \frac{1}{2}\left[g(\mathcal{G}_i) - g(\mathcal{G}_j) \cdot \ln\left(\frac{g(\mathcal{G}_i)}{g(\mathcal{G}_j)}\right)\right] \qquad \text{[Equation 9]}$$

When the illuminance component of the input image is relatively high, the dissimilarity may be measured through the Euclidean distance.

On the other hand, when the illuminance component of the input image is relatively low, the dissimilarity may be measured through the Kullback-leibler distance.

Operation S450 is an operation of removing noise of the center pixel of the reference patch from center pixel values of the target patches considering a weight based on the dissimilarity between patches.

The weight is calculated through Equation 10 below, $$k_{i,j} = \exp\left(-\frac{d(\mathcal{G}_i, \mathcal{G}_j)}{f \cdot g_i}\right) \qquad \text{[Equation 10]}$$

where $k_{i,j}$ is a weight for quantifying the correlation between the $i^{th}$ pixel group and the $j^{th}$ pixel group, $k_{i,j}$ and i are the reference patch having the $j^{th}$ pixel as the center pixel and the target patch having the $\mathcal{G}^{th}$ pixel as the center pixel, respectively, $k_{i,j}$ is the dissimilarity between two groups, $g_i$ is a pixel value of the $j^{th}$ pixel of the guidance image, and f is a parameter that determines the fidelity of a reconstructed image with respect to the guidance image. A and f are factors for adjusting the width of the weight $k_{i,j}$ on the horizontal axis.

Because and $\mathcal{G}_i$ are similar, the smaller the value of $d(\mathcal{G}_i, \mathcal{G}_j)$, the greater the value of the weight $k_{i,j}$. Conversely, because $\mathcal{G}_i$ and $\mathcal{G}_j$ are dissimilar, the greater the value of $d(\mathcal{G}_i, \mathcal{G}_j)$, the smaller the value of the weight $k_{i,j}$. Therefore, it may be expected that when an image with relatively little noise and a similar structure is used as a guidance, noise may be effectively removed and simultaneously detailed information may be preserved. Because the luminance component has the highest sensitivity and the highest signal-to-noise ratio (SNR) compared to an RGB component and a chrominance component of the YUV format, the luminance component is suitable for use as the guidance image.

Operation S450 is an operation of removing the noise of the center pixel of the reference patch from the center pixel values of the target patches considering the weight.

The noise is removed based on the NLM algorithm structure of Equations 6 and 7 above.

An operation of removing noise may include noise removal with respect to the luminance component and noise removal with respect to the color component. In the second image processing method according to the embodiment, the weight calculated based on the luminance component is applied to not only the noise with respect to the luminance component but also the noise with respect to the color component. That is, in the second image processing method, the noise of the chrominance and luminance components may be removed by using the luminance component as a guidance. As described above, because the luminance component has the highest sensitivity and the highest SNR compared to the RGB component and the chrominance component of the YUV format, the luminance component is suitable for use as the guide image.

A third image processing method according to an example embodiment may generate the second image data 200 by improving the dynamic range of the first image data 100 and removing the noise through the first image processing method described above and the second image processing method described above. That is, when the luminance component with the improved dynamic range calculated by the method of FIG. 2 and the value of the weight $k_{i,j}$ calculated through Equation 10 are applied to Equation 6, the luminance component from which noise is removed may be calculated from the luminance component with the improved dynamic range.

Specifically, the third image processing method includes: receiving an image; calculating a luminance component of the input image; estimating an illuminance component of the image using a luminance component; calculating a gamma value, based on the luminance component and the illuminance component; calculating a luminance component with an improved dynamic range by using a conversion ratio based on the gamma value; setting a reference patch including a plurality of pixels and target patches in the image corresponding to the reference patch by using an arbitrary pixel included in the input image as a center pixel; calculating dissimilarity between the reference patch and the target patches; and removing noise of the center pixel of the reference patch from center pixel values of the target patches considering a weight based on the dissimilarity between the patches.

Figure 5:
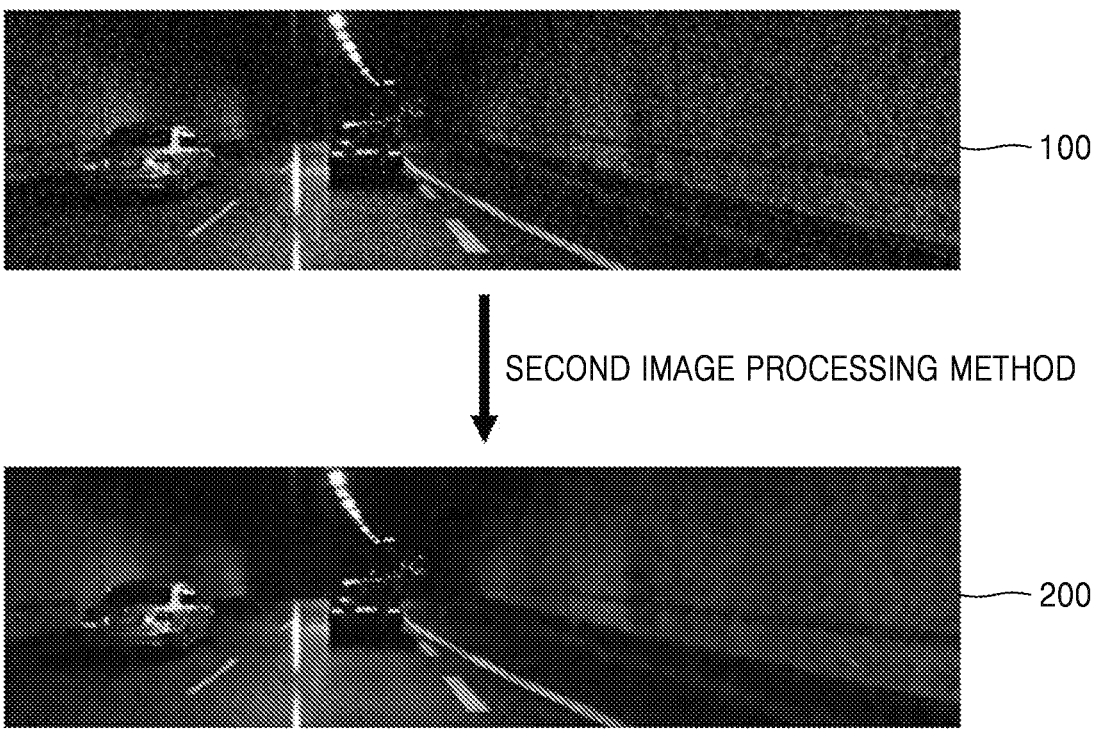
FIG. 5 illustrates an example of a second image from which noise is removed through a second image processing method and a first image.

FIG. 5 illustrates an example of a second image from which noise is removed through a second image processing method and a first image.

Figure 6:
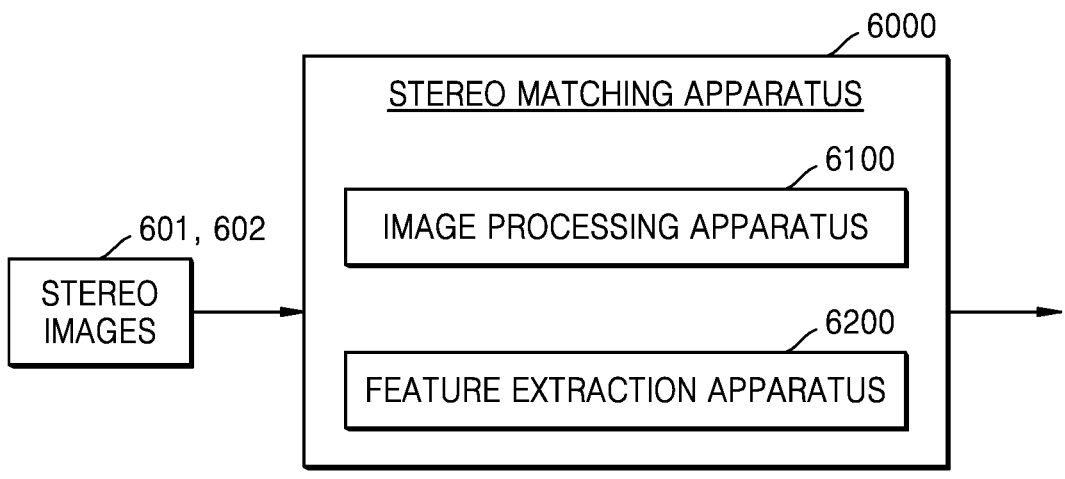
FIG. 6 is a block diagram of a stereo matching apparatus according to an example embodiment.

FIG. 6 is a block diagram of a stereo matching apparatus according to an example embodiment.

A stereo matching apparatus 6000 according to an example embodiment receives stereo images 601 and 602 and determines depth information based on the stereo images 601 and 602. The stereo matching apparatus 6000 includes an image processing apparatus 6100 and a feature extraction device 6200.

The stereo images 601 and 602 include different viewpoint images (e.g., a left image and a right image) obtained through two or more cameras. The viewpoint images are images captured at different locations (or viewpoints) at the same time. The stereo images 601 and 602 may be obtained by, for example, a stereo camera.

The stereo matching apparatus 6000 may search for pixel pairs corresponding to each other in the stereo images 601 and 602, and determine depth information of an object and a background based on disparity, which is a location difference between the corresponding pixel pairs. The depth information may be used to render a 3D image or to estimate a distance from a viewpoint of a camera to the object or the background. For example, the depth information may be used to estimate a distance to a vehicle or obstacle in front of the vehicle or the obstacle by using a stereo camera in a navigation system of the vehicle. As another example, in an augmented reality (AR) image, a real object and a virtual object may be mixed and expressed, and a location in an image to represent the virtual object may be determined by using the depth information of the real object. The stereo matching apparatus 6000 may be implemented as one or more software modules, hardware modules, or various combinations thereof.

According to an example embodiment, the modules of the stereo matching apparatus may be implemented as a hardware component, a software component, and/or a combination of the hardware component and the software component. For example, the stereo matching apparatus 6000 and/or the modules described in the example embodiments illustrated in FIG. 6 may be implemented by using a processor, an arithmetic logic unit (ALU), application specific integrated circuits (ASICs), digital signal processors (DSPs), digital signal processing devices (DSPDs), programmable logic devices (PLDs), a microcomputer, a microprocessor, or one or more general purpose computers or special purpose computers like any other device capable of executing and responding to instructions. Moreover, according to an example embodiment, the stereo matching apparatus 6000 may include a memory storing one or more instructions or program code, which when executed by the processor may perform various operations as described below. However, the disclosure is not limited thereto, and as such, the stereo matching apparatus 6000 may be implemented in a different manner The stereo matching apparatus 6000 determines the depth information through stereo matching. Stereo matching includes a process of extracting features of pixels included in each of the stereo images 601 and 602 and a process of comparing features extracted between the stereo images 601 and 602, searching for a corresponding pixel of each pixel, and predicting disparity. For example, the stereo matching apparatus 6000 may detect a corresponding pixel of a pixel included in the left image from the right image or detect a corresponding pixel of a pixel included in the right image from the left image. The stereo matching apparatus 6000 may use intensity information, color information, gradient information, or any combination thereof of the pixel to search for the corresponding pixel. The stereo matching apparatus 6000 determines the disparity based on a location difference between the detected corresponding pixels.

The stereo matching apparatus 6000 performs stereo matching through the feature extraction device 6200. The feature extraction apparatus 6200 may be configured based on a neural network. By using the feature extraction apparatus 6200 based on the neural network, the features of an image may be accurately and quickly estimated. The neural network is a statistical model that mimics features of a neural network in biology. The neural network has a problem-solving ability to output desirable results from input information. In order to develop such a problem-solving ability, a process of training (learning) artificial neurons (or nodes) that form a network through a combination of synapses is performed. Through the training process, values of parameters forming the neural network may be modified.

On the other hand, learning-based stereo matching requires high homeostasis with respect to the input image from the point of view of machine vision. An image captured in an unexpected environment such as fog or a tunnel may not match the learned input image in the environment. In particular, an image captured in a low illumination environment exhibits low regional contrast characteristics, making it difficult to distinguish boundaries between objects, greatly reducing the accuracy of a matching point, and resulting in incorrect distance estimation results because noise is mistakenly recognized as a subject due to a low SNR. Although such a problem may be improved through the method of learning a large amount of data set through a very deep network, it is not only astronomical cost but also it is insufficiently verified as to whether actual learning is possible.

The image processing apparatus 6100 according to an example embodiment may include the dynamic range enhancement module 1100 and/or the noise removal module 1200 described with reference to FIGS. 1 to 5. The image processing apparatus 6100 may receive a stereo image as an input, output an image in which homeostasis is maintained, and transmit the image to the feature extraction apparatus 6200 Specifically, the image processing apparatus 6100 may improve the dynamic range of the luminance component of the stereo image, remove noise from the luminance image with the improved dynamic range, and output an image maintaining homeostasis, and deliver the image to the feature extraction apparatus 6200.

Table 1 below is a table of measuring stereo distance estimation accuracy for each image of FIG. 7.

TABLE 1

| image | RMSE | EPE | Bad pixel ratio |
|---|---|---|---|
| 710 | 2.0570 | 1.3896 | 0.3360 |
| 720 | 1.8284 | 1.1547 | 0.2770 |
| 730 | 1.2573 | 0.8667 | 0.1903 |

Figure 7:
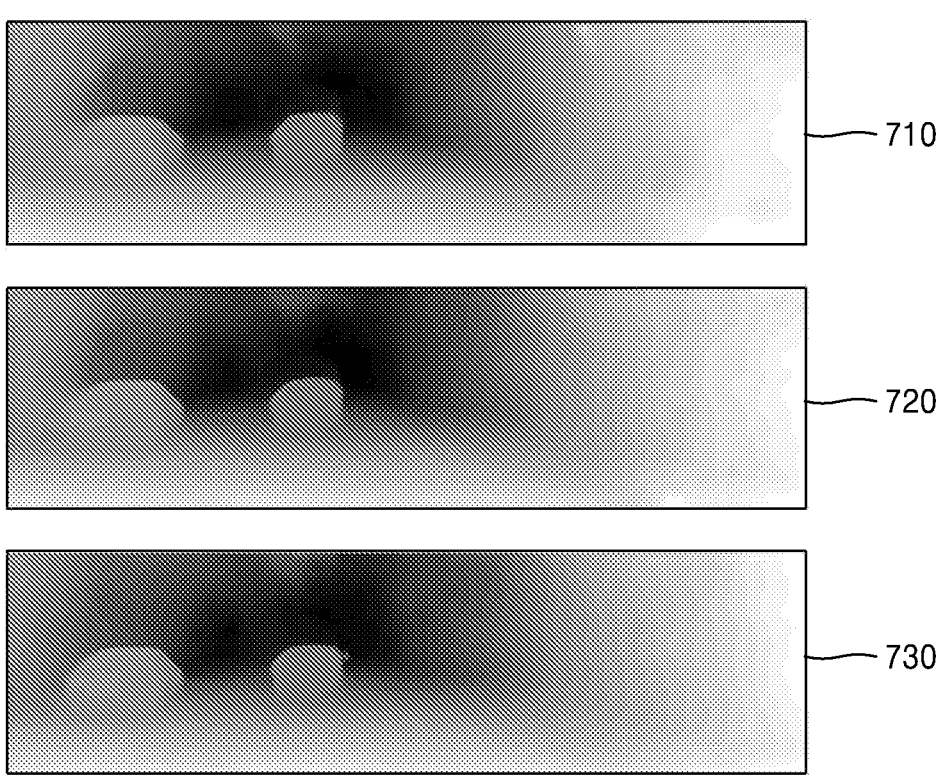
FIG. 7 are an input stereo image, a stereo image with an improved dynamic range, and a stereo image from which dynamic range and noise are removed.

In FIG. 7, an image 710 is an original input stereo image, an image 720 is a stereo image with an improved dynamic range through an image processing apparatus, and an image 730 is a stereo image from which dynamic range and noise are removed by the image processing apparatus.

In order to measure the distance estimation accuracy, the following three evaluation indexes were used.

First, the root mean squared error (RMSE) was measured to evaluate whether absolute distance information of the estimated distance image is consistent with ground truth information, and the end-point error (EPE) was measured to quantify a degree of difference between the location of an estimated main object and the location of an actual ground truth. In addition, a bad pixel ratio was calculated to measure the ratio of pixels in which the ground truth information is incorrectly estimated.

It may be seen that the image 730 exhibits high accuracy of distance estimation compared to the image 710.

Figure 8:
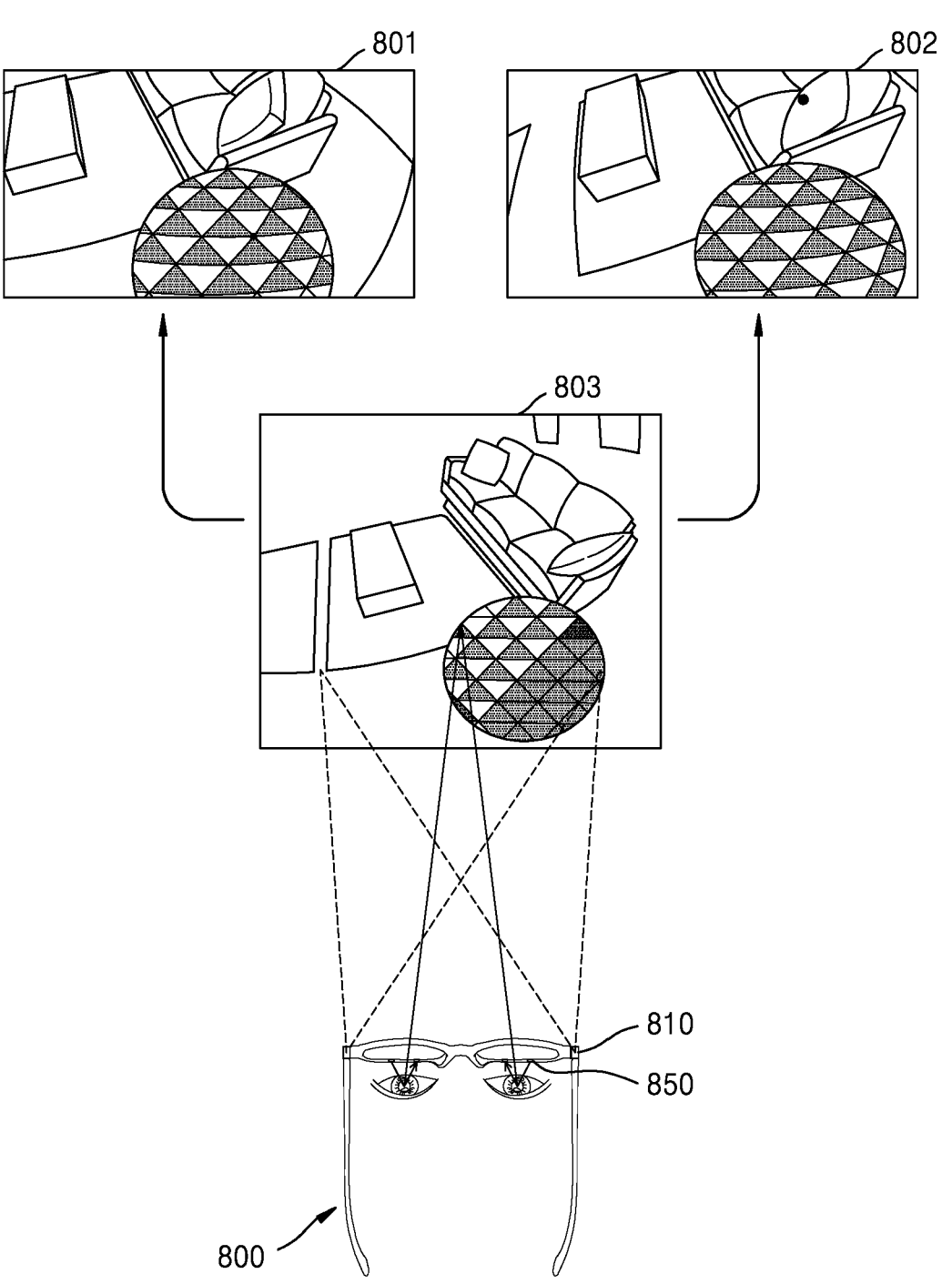
FIG. 8 is a diagram illustrating an image processing apparatus performing stereo matching according to an example embodiment.

FIG. 8 is a diagram illustrating an image processing apparatus performing stereo matching according to an example embodiment.

In FIG. 8, for convenience of description, an image processing apparatus 800 is an AR glasses device including a camera 810 obtaining a stereo image as an example, but the image processing apparatus 800 is not limited to the example shown in FIG. 8.

As shown in FIG. 8, when the image processing apparatus 800 is the AR glasses device, the camera 810 may be located on the forward-facing side at a part where a glasses frame supporting each lens and a glasses leg mounting the image processing device 800 on a users face contact each other, but is not limited thereto. The camera 810 is a stereo camera obtaining a stereo image, and may include a first camera obtaining a first image 801 and a second camera obtaining a second image 802. The stereo image may include the first image 801 and the second image 802. One of the first image 801 and the second image 802 may be a reference image, and the other may be a comparison image. The image processing apparatus 800 may estimate depth information of a space to model a 3D space 803. The image processing apparatus 800 may estimate the depth information of the space using a lens focal length of the camera 810 and a distance between the first camera and the second camera, and may generate a depth map based on the estimated depth information. An eye tracking sensor 850 may be located on one side of the glasses frame facing a face part so as to detect the users eyes, but is not limited thereto. The image processing apparatus 800 may be configured to include the dynamic range enhancement module 1100 and/or the noise removal module 1200 described with reference to FIGS. 1 to 5.

Figure 9:
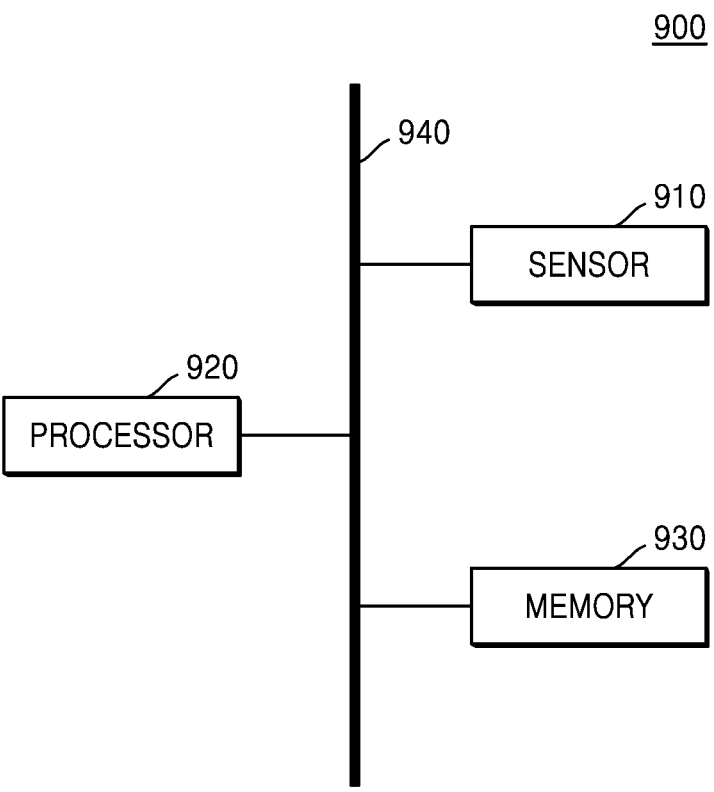
FIG. 9 is a diagram illustrating a configuration of an image processing apparatus according to an example embodiment.

FIG. 9 is a diagram illustrating a configuration of an image processing apparatus according to an example embodiment.

An image processing apparatus 900 according to an example embodiment includes a sensor 910, a processor 820, and a memory 930. The sensor 910, the processor 920, and the memory 930 may communicate with each other via a communication bus 940.

The sensor 910 may capture an image. In an example embodiment, the sensor 910 may capture a stereo image, and may include a first sensor capturing a first viewpoint image and a second sensor capturing a second viewpoint image. The first sensor and the second sensor may be, for example, image sensors, proximity sensors, or infrared sensors. According to an example embodiment, the sensor 910 may be a camera. The sensor 910 may capture the stereo image using a related art method (e.g., a method of converting an optical image into an electrical signal, etc.) The sensor 910 may transmit at least one of a captured color image, a depth image, or an infrared image to at least one of the processor 920 or the memory 930.

The processor 920 may process an operation related to the stereo matching or conversion parameter estimation described above. In an example embodiment, the processor 920 may convert the stereo image into feature maps using a feature extractor based on a neural network model, and calculate a matching cost between pixels based on feature information included in the feature maps. The processor 920 may determine corresponding pixel pairs corresponding to each other in the stereo image based on the matching cost, and estimate depth information based on disparity between the corresponding pixel pairs.

In another example embodiment, the processor 920 may improve a dynamic range of the stereo image by using the dynamic range enhancement module 1100 described above or remove noise of the stereo image by using the noise removal module 1200 described above, and then, process the operation related to stereo matching or conversion parameter estimation by using the feature extractor.

In another example embodiment, the processor 920 may extract feature points from images captured at different times and determine feature vectors corresponding to the feature points by using the feature extractor. Thereafter, the processor 920 may determine feature point pairs corresponding to each other in the images by comparing the feature vectors between the images, and may estimate a transformation parameter based on location information of the determined corresponding feature point pairs.

In addition, the processor 920 may perform at least one of the operations described above with reference to FIGS. 1 to 6, and a more detailed description thereof is omitted. The processor 920 may execute instructions or programs or control the image processing apparatus 900.

The memory 930 may store information used in the stereo matching or transformation parameter estimation described above and result information. Also, the memory 930 may store computer-readable instructions. When the instructions stored in the memory 930 are executed by the processor 920, the processor 920 may process one or more operations described above.

The image processing apparatus 900 described above may receive a user input or output an image and a processing result on an input/output device. Also, the image processing apparatus 900 may be connected to an external device (e.g., a personal computer or a network) through a communication device and exchange data with the external device.

The image processing apparatus 900 may be implemented as a hardware component, a software component, and/or a combination of the hardware component and the software component. For example, the image processing apparatus 900 described in the example embodiments may be implemented by using a processor, an arithmetic logic unit (ALU), application specific integrated circuits (ASICs), digital signal processors (DSPs), digital signal processing devices (DSPDs), programmable logic devices (PLDs), a microcomputer, a microprocessor, or one or more general purpose computers or special purpose computers like any other device capable of executing and responding to instructions.

Software may include a computer program, code, instructions, or a combination of one or more of these, and may configure a processing device to operate as desired or, independently or collectively, instruct the processing device.

The software may be implemented as a computer program including instructions stored in computer-readable storage media. The computer-readable storage media include, for example, a magnetic storage medium (e.g., read-only memory (ROM), random-access memory (RAM), a floppy disk, a hard disk, etc.) and an optically readable medium (e.g., a CD-ROM, a Digital Versatile Disc (DVD)), etc. The computer-readable storage media may be distributed among network-connected computer systems, so that computer-readable code may be stored and executed in a distributed manner. The media may be readable by a computer, stored in a memory, and executed on a processor.

The computer may include the image processing apparatus 1000 according to the example embodiments as a device capable of calling a stored instruction from a storage medium and operating in response to the called instruction according to the example embodiment.

The computer-readable storage media may be provided in the form of non-transitory recording media. Here, 'non-transitory' merely means that a storage medium does not include a signal and is tangible, and does not limit that data is semi-permanently or temporarily stored in the storage medium.

Also, the method according to the described embodiments may be included and provided in a computer program product. The computer program product may be traded as a product between a seller and a buyer.

The computer program product may include a software program and a computer-readable storage medium with a software program stored therein. For example, the computer program product may include products in the form of a software program (e.g., a downloadable application) electronically distributed through manufacturers of the electronic processing device 1000 or electronic markets (e.g., Google Play Store and App Store). For electronic distribution, at least a portion of the software program may be stored in a storage medium or may be temporarily generated. In this regard, the storage medium may be a storage medium of a server of a manufacturer, a server of an electronic market, or a relay server for temporarily storing the software program.

In a system including a server and a terminal (e.g., an image processing apparatus), the computer program product may include a storage medium of the server or a storage medium of the terminal. Alternatively, when there is a third device (e.g., a smartphone) communicatively connected to the server or the terminal, the computer program product may include a storage medium of the third device. Alternatively, the computer program product may include the software program itself that is transmitted from the server to the terminal or the third device or transmitted from the third device to the terminal.

In this regard, one of the server, the terminal, and the third device may execute the computer program product to perform the method according to the described embodiments. Alternatively, two or more of the server, the terminal, and the third device may execute the computer program product to perform the method according to the described embodiments in a distributed manner.

For example, the server (e.g., a cloud server or an artificial intelligence server) may execute the computer program product stored in the server, to control the terminal communicatively connected to the server to perform the method according to the described embodiments.

As another example, the third device may execute the computer program product to control the terminal communicatively connected to the third device to perform the method according to the example embodiment.

When the third device executes the computer program product, the third device may download the computer program product from the server and execute the downloaded computer program product. Alternatively, the third device may execute a computer program product provided in a preloaded state to perform the method according to the example embodiments.

As described above, although the embodiments have been described with reference to the limited embodiments and drawings, various modifications and variations are possible by those skilled in the art from the above description. For example, even though the described technologies are performed in an order different from the described method, the described components of electronic devices, structures, circuits, etc. are combined or coupled in a different form from the described method, or are replaced or substituted by other components or equivalents, appropriate results may be achieved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An image processing method comprising:
receiving a first image;
calculating a luminance component of the first image;
estimating an illuminance component of the first image by using the luminance component;
calculating a gamma value, based on the luminance component and the illuminance component;
calculating a modified luminance component using a conversion ratio based on the gamma value; and
generating a second image corresponding to the first image based on the modified luminance component.

2. The image processing method of claim 1, wherein the estimating of the illuminance component comprises calculating the illuminance component that minimizes a cost function with respect to a relationship between the luminance component and the illuminance component.

3. The image processing method of claim 2, wherein the cost function comprises a first similarity value corresponding to an amount of similarity between the luminance component and the illuminance component.

4. The image processing method of claim 3, wherein the first similarity value is calculated by performing a norm operation on a difference between the luminance component and the illuminance component.

5. The image processing method of claim 2, wherein the cost function comprises high frequency information of the illuminance component.

6. The image processing method of claim 5, wherein the high frequency information is a value obtained by performing a norm operation on the illuminance component passing through a Laplacian filter.

7. The image processing method of claim 2, wherein the cost function comprises a second similarity value corresponding to an amount of similarity between edge components of the luminance component and the illuminance component.

8. The image processing method of claim 7, wherein the second similarity value is calculated by performing a norm operation on a gradient value of a difference between the luminance component and the illuminance component.

9. The image processing method of claim 1, wherein the gamma value is obtained by dividing the luminance component by the illuminance component.

10. An image processing method comprising:
receiving a first image;
setting a reference patch and target patches in the first image by designating an arbitrary pixel included in the first image as a center pixel of the reference patch, the reference patch comprises a plurality of pixels and the target patches correspond to the reference patch;
calculating a dissimilarity value corresponding to an amount of dissimilarity between the reference patch and the target patches; and
generating a second image by removing noise of the center pixel of the reference patch of the first image from center pixel values of the target patches of the first image according a weight based on the dissimilarity value,
wherein the removing of the noise comprises:
separating the first image into a luminance component and a color component, and
removing noise of the luminance component and noise of the color component by commonly applying the weight calculated based on the luminance component to both the luminance component and the color component.

11. The image processing method of claim 10, wherein the dissimilarity value is measured through a Euclidean distance between the reference patch and the target patches.

12. The image processing method of claim 10, wherein the dissimilarity value is measured through a Kullback-leibler distance between the reference patch and the target patches.

13. An image processing method comprising:

receiving a first image;

calculating a luminance component of the first image;

estimating an illuminance component of the first image by using the luminance component;

calculating a gamma value, based on the luminance component and the illuminance component;

calculating a modified luminance component using a conversion ratio based on the gamma value;

setting a reference patch and target patches in the first image by designating an arbitrary pixel included in the first image as a center pixel of the reference patch, the reference patch comprises a plurality of pixels and the target patches correspond to the reference patch;

calculating a dissimilarity value corresponding to an amount of dissimilarity between the reference patch and the target patches; and generating a second image based on the modified luminance component and by removing noise of the center pixel of the reference patch of the first image from center pixel values of the target patches of the first image according a weight based on the dissimilarity value.

14. The image processing method of claim 13, wherein, based on a value of the illuminance component being higher than a reference value, the dissimilarity value is measured through a Euclidean distance between the reference patch and the target patches.

15. The image processing method of claim 13, wherein, based on a value of the illuminance component being lower than a preset reference value, the dissimilarity value is measured through a Kullback-leibler distance between the reference patch and the target patches.

16. The image processing method of claim 1, wherein the luminance component of the first image is obtained by converting the first image in a RGB format to a YUV format and obtaining a Y value as the luminance component.

17. The image processing method of claim 2, wherein the cost function is F (m) as follows:

$$F(m) = \|m - y\|_2^2 + \lambda_1 \|Cm\|_2^2 + \lambda_2 \|\nabla(m - y)\|_2^2,$$

where m is a vector representing the illuminance component, y is a vector representing the luminance component, C is a Laplacian filter serving as a high pass filter, $\nabla$ is a gradient operator for determining edge information in the image, and $\lambda_1$ and $\lambda_2$ are regularization parameters.

18. The image processing method of claim 1, wherein the conversion ratio is further based on a maximum value in luminance of neighboring pixels of a $i^{th}$ pixel in the first image and luminance of the $i^{th}$ pixel in the first image.

19. The image processing method of claim 1, wherein the conversion ratio is expressed by a gamma curve as follows:

$$\hat{y}_i = y_{i,max} \cdot \left(\frac{y_i}{y_{i,max}}\right)^{\gamma},$$

Where $\gamma$ is the gamma value, $y_{i,max}$ is a maximum value in luminance of neighboring pixels of a $i^{th}$ pixel, $\hat{y}_i$ is luminance of the $i^{th}$ pixel with an improved dynamic range, and $y^i$ is luminance of the $i^{th}$ pixel.

20. The image processing method of claim 10, wherein the weight $k_{i,j}$ is calculated as follows:

$$k_{i,j} = \exp\left(-\frac{d(\mathcal{G}_i, \mathcal{G}_j)}{f \cdot g_i}\right),$$

where $k_{i,j}$ is the weight for quantifying the correlation between a $i^{th}$ pixel group and a $j^{th}$ pixel group, where $\vartheta_i$ and $\vartheta_j$ are a reference patch having the $i^{th}$ pixel as the center pixel and a target patch having the $j^{th}$ pixel as the center pixel, respectively, $d(\vartheta_i, \vartheta_j)$ is the dissimilarity between two groups, $\vartheta_i$ is a pixel value of a $i^{th}$ pixel of a guidance image, and f is a parameter that determines the fidelity of a reconstructed image with respect to the guidance image.

* * * * *